May 19, 1931.  L. FERENCI  1,805,692

AUTOMATIC SLIP COUPLING

Filed Oct. 22, 1929

INVENTOR
Lester Ferenci
BY
Sydney Prescott
ATTORNEY

Patented May 19, 1931

1,805,692

UNITED STATES PATENT OFFICE

LESTER FERENCI, OF BROOKLYN, NEW YORK, ASSIGNOR TO AMERICAN MACHINE & FOUNDRY COMPANY, A CORPORATION OF NEW JERSEY

AUTOMATIC SLIP COUPLING

Application filed October 22, 1929. Serial No. 401,460.

This invention relates to an improvement in automatic slip couplings intended for use in connection with automatic machinery for the purpose of stopping such a machine in case the load is suddenly increased by trouble within the machine, and relates particularly to an improvement in couplings such as that disclosed in applicant's U. S. Patent No. 1,710,694, in which the slipping point of the coupling is controlled by centrifugal force.

The above patented coupling is combined with a centrifugal governor having weighted lever arms in such a manner that the speed of the machine controls the spring pressure of the coupling, so that, at rest, they exert maximum pressure and that, with increasing speed, the pressure is proportionately released until, at normal speed, it is reduced to an amount just sufficiently greater than the required driving pressure to give to the coupling the desired safety margin for disengagement.

The object of the present invention is to attain the same or better results by application of the same general principle, employing, however, a construction which is more compact, simple and direct in action. To this end, the clutch elements which actually connect the driving and driven parts, are so constructed and mounted that the action of centrifugal force on said elements serves to control the slipping point of the coupling in accordance with the above principles.

Accordingly, in carrying the invention into effect there is provided an automatic slip coupling comprising the usual rotary driven and driving members, weighty clutch elements carried by one of said members and engaging the other member, and clutch element controlling means acting counter to the action of centrifugal force on said elements, so that there is a maximum resistance to slippage when the machine is starting up and centrifugal force is at a minimum, and yet the coupling may readily slip in response to abnormal operating conditions after normal running speed is attained. In the best constructions, the clutch elements comprise a series of balls adapted to engage in cooperating depressions in the engaged member, and preferably said means consists of a resilient member encircling and contracting on said elements.

With the above and other objects not specifically mentioned in view, the invention consists in certain constructions and combinations which will be hereinafter fully described and then specifically set forth in the claims hereunto appended.

Figure 1:
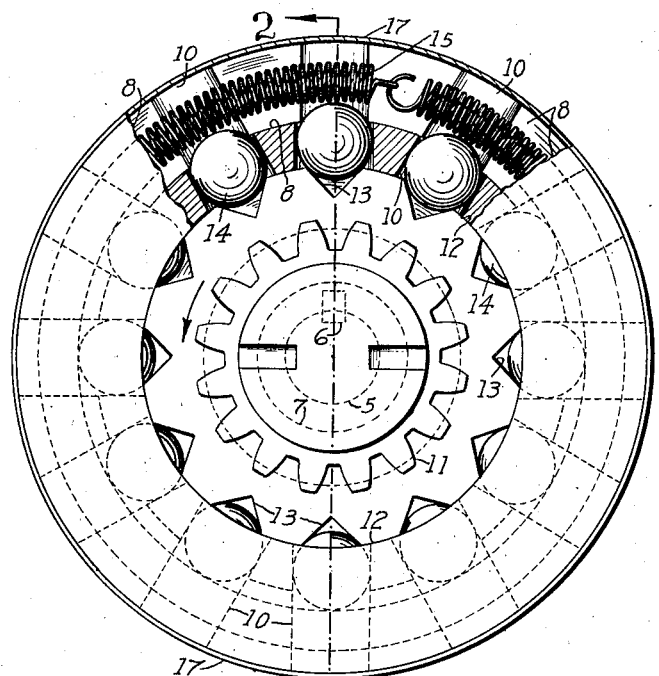
Figure 2:
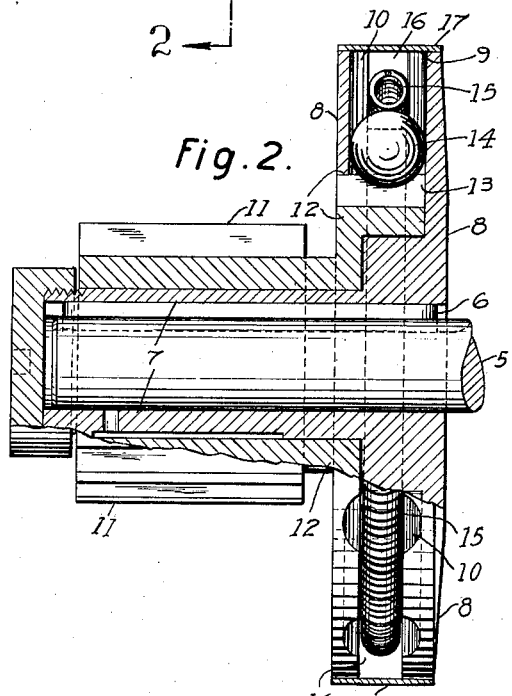

In the accompanying drawings in which like characters of reference indicate the same or like parts:

Fig. 1 is an end elevation of an improved automatic slip coupling constructed in accordance with the invention: and Fig. 2 is a sectional side elevation of the same taken on line 2—2 of Fig. 1.

Referring to the drawings, to the driving member or drive shaft 5, by means of a key 6, there is fastened a sleeve 7 which forms the hub of a disk 8 having an annulus 9 provided with radial channels 10. On the sleeve 7 is loosely mounted the driven spur gear 11, a flanged extension 12 of which protrudes into disk 8, the flange 12 having on its periphery a plurality of equally spaced V-shaped notches or depressions 13 which register with the radial channels 10 of the disk 8.

The driving member 5 carries weighty clutch balls 14 by means of the channels 10, which house the balls. The engagement of balls 14, in the notches 13, is controlled by a coil spring 15 fitting into the groove 16 which connects the outer ends of the channels. This spring forms clutch element controlling means which urges the balls inwardly along the radial channels in direct opposition to centrifugal force which urged them outwardly along the same channels. An endless band 17 fitting around the circumference of annulus 9 serves as a guard in case of breakage of spring 15.

At normal speed, the pressure of spring 15 is just enough greater than the opposing centrifugal force of the balls to hold the balls 14 in working engagement with the grooves 13, with a predetermined load. Any substantial overload at normal running speed will, therefore, cause the coupling to slip.

The various means referred to may be varied widely in construction within the scope of the claims, for the particular device selected to illustrate the invention is but one of many possible concrete embodiments of the same. The invention, therefore, is not to be restricted to the precise details of the structure shown and described.

It should be noted that owing to the engagement of the balls within the notches a relatively small inward pressure by spring 15, small enough to be substantially decreased by the centrifugal force of moderate sized balls, will be sufficient to transmit a considerable amount of power without slipping for starting purposes. When slipping, the clattering of the balls over the notches will also serve to audibly signal the operator that something is wrong with the machine.

What is claimed is:

1. An automatic slip coupling comprising rotary driven and driving members, weighty clutch elements carried by one of said members and engaging the other member, and clutch element controlling means acting counter to the action of centrifugal force on said elements, the engaged member having a notched periphery about which said elements are arranged, and said means consisting of a resilient member encircling and contracting on said elements.

2. An automatic slip coupling comprising rotary driven and driving members, weighty clutch elements carried by one of said members and engaging the other member, and clutch element controlling means acting counter to the action of centrifugal force on said elements, the engaged member having a notched periphery about which said elements are arranged, and said means including a single spring acting with equal force on each of said elements.

3. An automatic slip coupling comprising rotary driven and driving members, weighty clutch elements carried by one of said members and engaging the other member, and clutch element controlling means acting counter to the action of centrifugal force on said elements, the carrying member having a series of radial channels surrounding the engaged member, and housing said elements, and an annular groove connecting the outer ends of said channels, said means consisting of a resilient ring in said groove.

In testimony whereof, I have signed my name to this specification.

LESTER FERENCI.